(12) United States Patent
Sakuma et al.

(10) Patent No.: US 9,052,220 B2
(45) Date of Patent: Jun. 9, 2015

(54) MAINTAINING MEMBER, MODULE, AND ELECTRONIC APPARATUS

(75) Inventors: Masayasu Sakuma, Kamiina (JP); Yoshihiro Kobayashi, Komagane (JP); Shojiro Kitamura, Suwa (JP); Taketo Chino, Hokuto (JP); Michiharu Ogami, Sakata (JP)

(73) Assignee: SEIKO EPSON CORPORATION (JP)

( * ) Notice: Subject to any disclaimer, the term of this patent is extended or adjusted under 35 U.S.C. 154(b) by 47 days.

(21) Appl. No.: 13/478,694

(22) Filed: May 23, 2012

(65) Prior Publication Data

US 2012/0307459 A1 Dec. 6, 2012

(30) Foreign Application Priority Data

May 31, 2011 (JP) ................. 2011-122791

(51) Int. Cl.
*H05K 7/02* (2006.01)
*F16M 13/00* (2006.01)
*G01D 11/30* (2006.01)

(52) U.S. Cl.
CPC ..................... *G01D 11/30* (2013.01)

(58) Field of Classification Search
USPC ............ 361/715, 728, 730, 736, 683, 679.34, 361/600, 622, 749, 753, 807, 809, 810, 741, 361/679.33, 679.01; 73/855, 431; 248/309.1, 638
See application file for complete search history.

(56) References Cited

U.S. PATENT DOCUMENTS

| | | | |
|---|---|---|---|
| 5,233,871 A | 8/1993 | Schwarz et al. | |
| 6,738,721 B1 | 5/2004 | Drücke et al. | |
| 7,040,922 B2 | 5/2006 | Harney et al. | |
| 7,291,023 B1 | 11/2007 | Still et al. | |
| 8,605,919 B2 | 12/2013 | Awamura et al. | |
| 2003/0011980 A1* | 1/2003 | Albrecht et al. | 361/685 |
| 2008/0100732 A1 | 5/2008 | Minamio et al. | |
| 2008/0117324 A1 | 5/2008 | Minamio et al. | |
| 2008/0144302 A1* | 6/2008 | Rosenblatt | 361/809 |
| 2008/0152272 A1 | 6/2008 | Debrailly et al. | |
| 2009/0056446 A1 | 3/2009 | Cluff et al. | |
| 2009/0095510 A1* | 4/2009 | Ono et al. | 174/254 |
| 2009/0255335 A1 | 10/2009 | Fly et al. | |
| 2009/0283891 A1 | 11/2009 | Dekker et al. | |

(Continued)

FOREIGN PATENT DOCUMENTS

| | | |
|---|---|---|
| CN | 101109634 A | 1/2008 |
| CN | 101416302 A | 4/2009 |

(Continued)

OTHER PUBLICATIONS

STIC search :STIC Report 13478694, Apr. 29, 2015.*

(Continued)

*Primary Examiner* — Jayprakash N Gandhi
*Assistant Examiner* — Michael Matey
(74) *Attorney, Agent, or Firm* — Harness, Dickey & Pierce, P.L.C.

(57) ABSTRACT

A maintaining member includes alignment portions that determine a maintaining position of a module, in which each of the alignment portions has a mounting face to fix the module. When the maintaining member is partitioned into a first region to a fourth region by a first axis and a second axis that are orthogonal to each other in plan view with respect to the center of the maintaining member, the alignment portions are provided at the regions one by one.

13 Claims, 10 Drawing Sheets

(56) References Cited

U.S. PATENT DOCUMENTS

| | | |
|---|---|---|
| 2009/0308157 A1 | 12/2009 | Eriksen et al. |
| 2011/0077820 A1 | 3/2011 | Tokui et al. |
| 2011/0110055 A1* | 5/2011 | Phillps et al. ............. 361/756 |
| 2011/0162452 A1* | 7/2011 | Ono et al. .............. 73/514.01 |
| 2011/0297745 A1 | 12/2011 | Isuyama |
| 2013/0111993 A1 | 5/2013 | Wang |

FOREIGN PATENT DOCUMENTS

| | | |
|---|---|---|
| CN | 101532840 A | 9/2009 |
| CN | 102121829 A | 7/2011 |
| JP | 05-223839 | 9/1993 |
| JP | 05-340960 | 12/1993 |
| JP | 07-306047 | 11/1995 |
| JP | 11-211481 | 8/1999 |
| JP | 11-281407 | 10/1999 |
| JP | 11-289141 | 10/1999 |
| JP | 2001-102746 | 4/2001 |
| JP | 2002-009228 | 1/2002 |
| JP | 2003-107549 A | 4/2003 |
| JP | 2005-197493 | 7/2005 |
| JP | 2007-057288 A | 3/2007 |
| JP | 2007-059701 A | 3/2007 |
| JP | 2010-192060 A | 9/2010 |
| JP | 2010-231895 A | 10/2010 |
| JP | 2011-075442 A | 4/2011 |
| WO | WO-2011-140804 A1 | 11/2011 |

OTHER PUBLICATIONS

Extended European Search Report for Application No. 12 16 9761 mailed Oct. 17, 2012 (5 pages).

J. Barton et al, "Design, Fabrication and Testing of Miniaturised Wireless Inertial Measurement Units (IMU)", 2007 Electronic Components and Technology Conference [pp. 1143-1148], Tyndall National Institute, Lee Maltings, Prospect Row, Cork, Ireland.

* cited by examiner

MAINTAINING MEMBER, MODULE, AND ELECTRONIC APPARATUS

BACKGROUND

1. Technical Field

The present invention relates to a maintaining member, a module, and an electronic apparatus.

2. Related Art

For example, a sensor unit disclosed in U.S. Pat. No. 7,040,922 is known. The sensor unit disclosed in U.S. Pat. No. 7,040,922 is provided with a mounting member that has a rectangular parallelepiped shape and three faces orthogonal to each other, and sensor devices mounted on the three faces, respectively.

In the case of mounting these sensor devices on a circuit board or the like, directly mounting the sensor devices on the circuit board is difficult, and the sensor devices are generally mounted in a state of being accommodated in a casing including a maintaining member and a cover member. However, when the sensor devices are accommodated in this casing, the size of the sensor devices may increase. In addition, when the sensor devices are fixed in an inclined state with respect to the casing, detection axes of the sensor devices are inclined and therefore detection accuracy may be lowered. That is, a casing, which is capable of performing the positioning of the sensor devices while promoting a reduction in size, is anticipated.

SUMMARY

An advantage of some aspects of the invention is to provide a maintaining member that is capable of performing the positioning of a module in a simple and exact manner while promoting a reduction in size, a module, and an electronic apparatus.

An aspect of the invention is directed to a maintaining member that maintains a module. The maintaining member includes at least a pair of alignment portions that determine a maintaining position of the module, wherein the alignment portions have a mounting face to fix the module, when the maintaining member is partitioned into a first region to a fourth region by a first axis and a second axis that are orthogonal to each other in plan view with respect to the center of the maintaining member, the first region and the second region are present at positions that are point-symmetrical to each other with respect to the center, and the alignment portions are disposed at the first region and the second region, respectively.

According to this configuration, a maintaining member, which is capable of performing the positioning of the module in a simple and accurate manner, may be obtained.

In the maintaining member according to this aspect of the invention, it is preferred that the maintaining member is provided with a concave portion, and the alignment portions make up at least a part of side walls of the concave portion.

According to this configuration, the configuration of the maintaining member becomes simple.

In the maintaining member according to this aspect of the invention, it is preferred that the mounting face of the alignment portion is lower than the opening face of the concave portion.

According to this configuration, an edge portion of the maintaining portion functions as a guiding portion when the module is mounted on the mounting faces.

In the maintaining member according to this aspect of the invention, it is preferred that the third region and the fourth region are present at positions that are point-symmetrical to each other with respect to the center, and the alignment portions are disposed at the third region and the fourth region, respectively.

According to this configuration, the module may be stably mounted on the mounting faces.

In the maintaining member according to this aspect of the invention, it is preferred that the respective mounting faces of the alignment portions are flush with each other.

According to this configuration, the module may be stably mounted on the mounting faces.

In the maintaining member according to this aspect of the invention, it is preferred that at least one of the mounting faces of the alignment portions is provided with a protruding portion or a hole portion.

According to this configuration, the module may be fixed to the maintaining member by making the module engage with the hole portion or the protruding portion.

In the maintaining member according to this aspect of the invention, it is preferred that the maintaining member is provided with a filler on a face side in which the alignment portion is provided.

According to this configuration, unnecessary vibration of the module may be suppressed.

In the maintaining member according to this aspect of the invention, it is preferred that the maintaining member is provided with a fixing portion that fixes the maintaining member to an object.

According to this configuration, the maintaining member may be simply fixed to the object.

In the maintaining member according to this aspect of the invention, it is preferred that the fixing portion is provided in the first region and the second region.

According to this configuration, the maintaining member may be stably fixed to the object.

Another aspect of the invention is directed to a module including a module, and a maintaining member that maintains the module, wherein the maintaining member includes at least a pair of alignment portions that determine a maintaining position of the module, each of the alignment portions has a mounting face to fix the module, when the maintaining member is partitioned into a first region to a fourth region by a first axis and a second axis that are orthogonal to each other in plan view with respect to the center of the maintaining member, the first region and the second region are present at positions that are point-symmetrical to each other with respect to the center, the alignment portions are disposed at the first region and the second region, respectively, and the module is maintained on the mounting faces.

According to this configuration, a maintaining member, which is capable of performing the positioning of the module in a simple and accurate manner, may be obtained.

In the module according to this aspect of the invention, it is preferred that the maintaining member is provided with a concave portion, and the alignment portions make up at least a part of side walls of the concave portion.

According to this configuration, the configuration of the maintaining member becomes simple.

In the module according to this aspect of the invention, it is preferred that the module is provided with an electronic component on the maintaining member side, and at least a part of the electronic component is accommodated in the concave portion.

According to this configuration, the space of the maintaining member may be effectively used, and therefore a reduction in size may be promoted.

In the module according to this aspect of the invention, it is preferred that the third region and the fourth region are present at positions that are point-symmetrical to each other with respect to the center, and the alignment portions are disposed at the third region and the fourth region, respectively.

According to this configuration, the positioning of the module with respect to the maintaining member may be performed in a relatively reliable and stable manner.

In the module according to this aspect of the invention, it is preferred that the respective mounting faces of the alignment portions are flush with each other.

According to this configuration, the module may be stably mounted on the mounting faces.

In the module according to this aspect of the invention, it is preferred that a protruding portion is provided to one side of the mounting face or the module, and a hole portion may be provided to the other side thereof, and the protruding portion and the hole portion engage with each other.

According to this configuration, the module may be fixed to the maintaining member.

In the module according to this aspect of the invention, it is preferred that the maintaining member is provided with a filler on a face side in which the alignment portion is provided, and the maintaining member and the module are bonded with the filler.

According to this configuration, unnecessary vibration of the module may be suppressed.

In the module according to this aspect of the invention, it is preferred that a plurality of physical quantity sensors in which detection axes intersect each other are mounted in the module.

According to this configuration, the module may be used as a sensor module.

In the module according to this aspect of the invention, it is preferred that the maintaining member is provided with a fixing portion that fixes the maintaining member to an object, and the fixing portion is provided in the first region and the second region.

According to this configuration, the maintaining member may be simply fixed to the object.

In the module according to this aspect of the invention, it is preferred that the module further includes a cover member that covers the module and is fixed to the maintaining member.

In the module according to this configuration, the module can be protected.

Still another aspect to the invention is directed to an electronic apparatus including the module according to the aspect of the invention.

According to this configuration, an electronic apparatus with high reliability may be obtained.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, a maintaining member, a module, and an electronic apparatus according to the invention will be described in detail with reference to preferred embodiments shown in the attached drawings.

1. Module

First, a module (a module of the invention) to which a maintaining member according to the invention is applied will be described.

First Embodiment

Figure 1A:
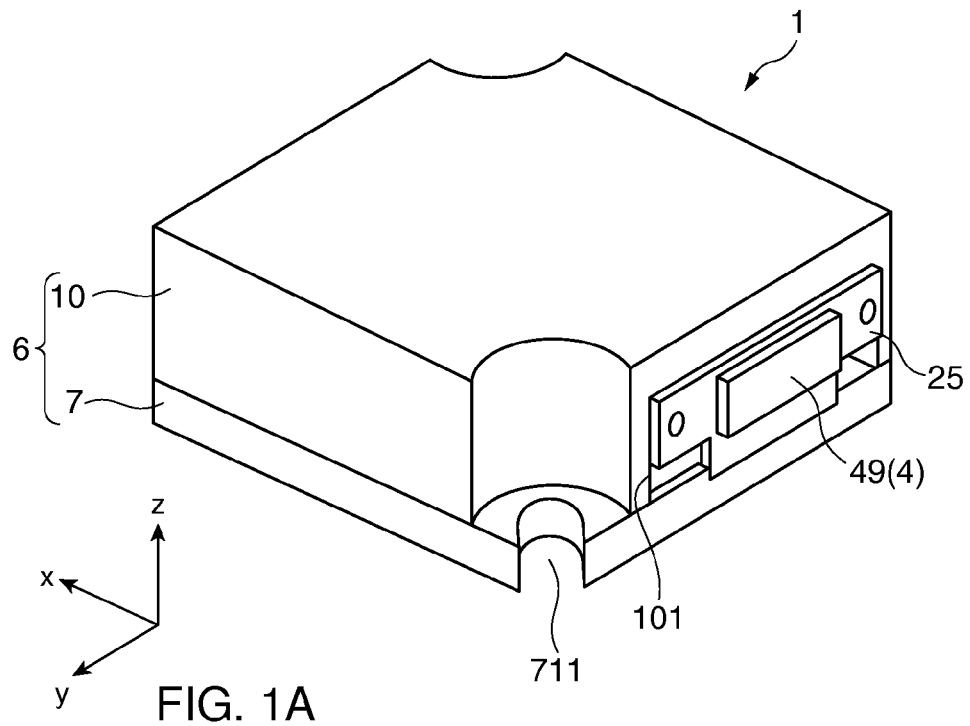
FIGS. 1A and 1B are perspective views illustrating a very suitable embodiment of a module according to the invention.
Figure 1B:
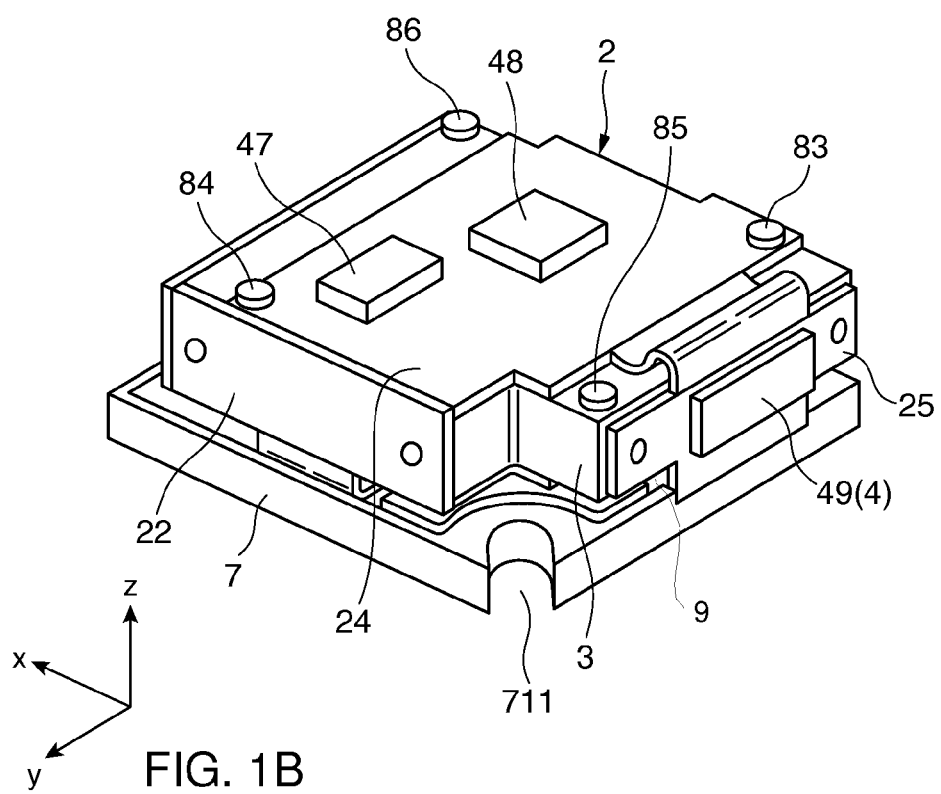
Figure 2A:
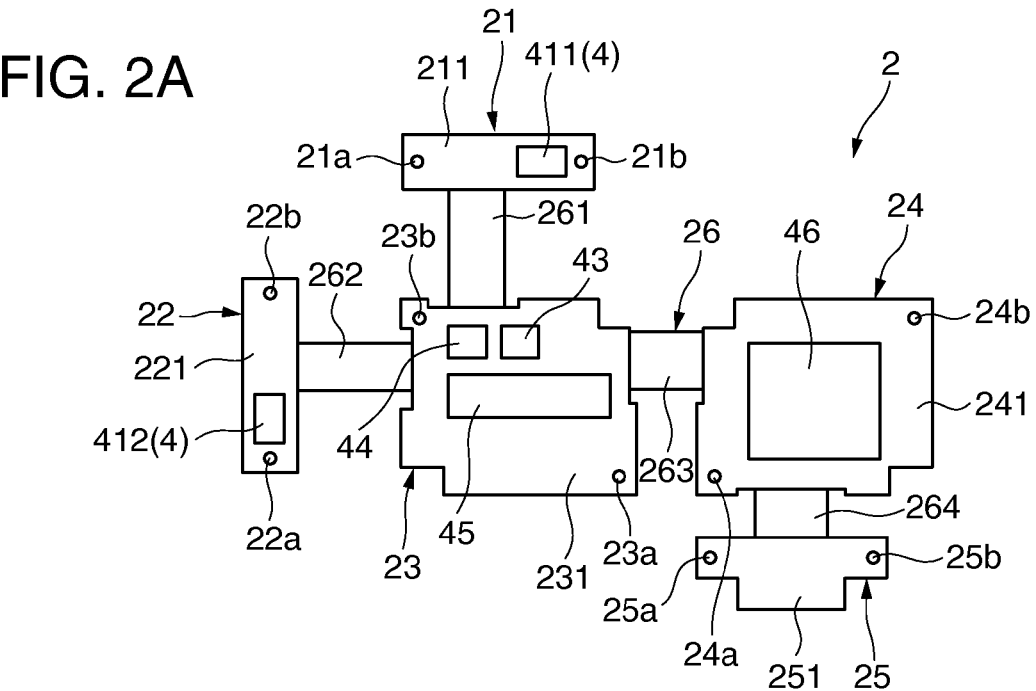
FIGS. 2A and 2B are development views of a mounting substrate provided to the module shown in FIGS. 1A and 1B.
Figure 2B:
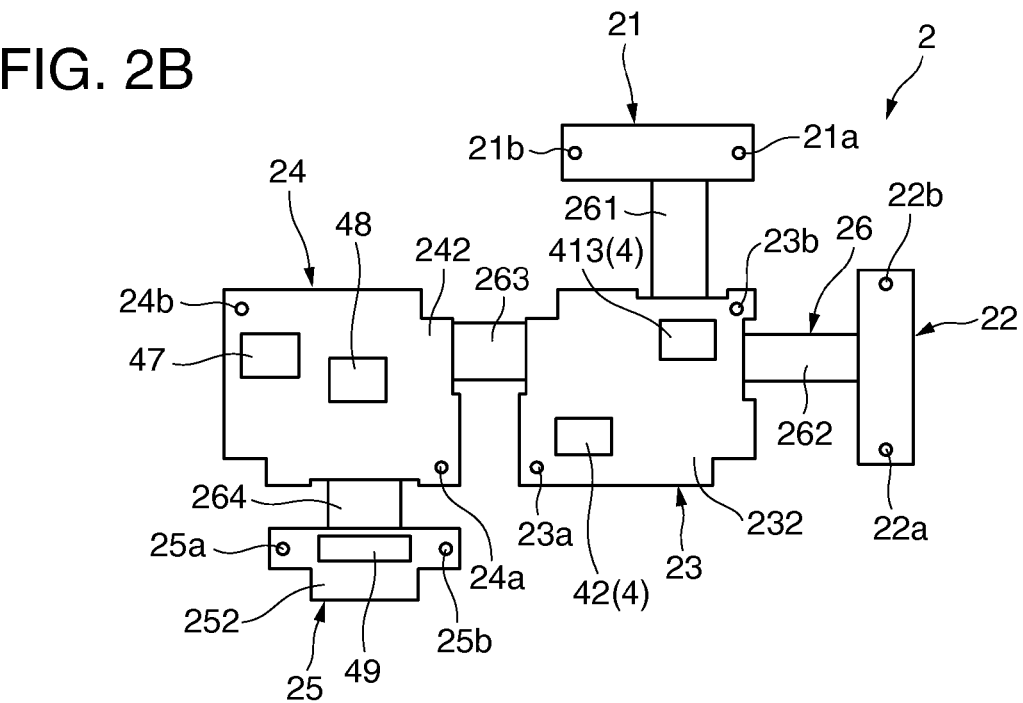
Figure 3:
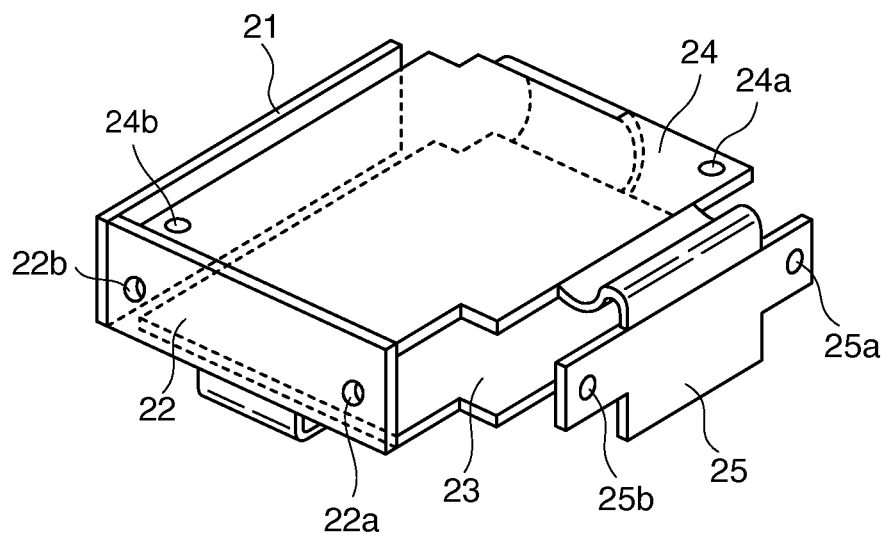
FIG. 3 is a perspective view illustrating a state in which the mounting substrate shown in FIGS. 2A and 2B is assembled.
Figure 4:
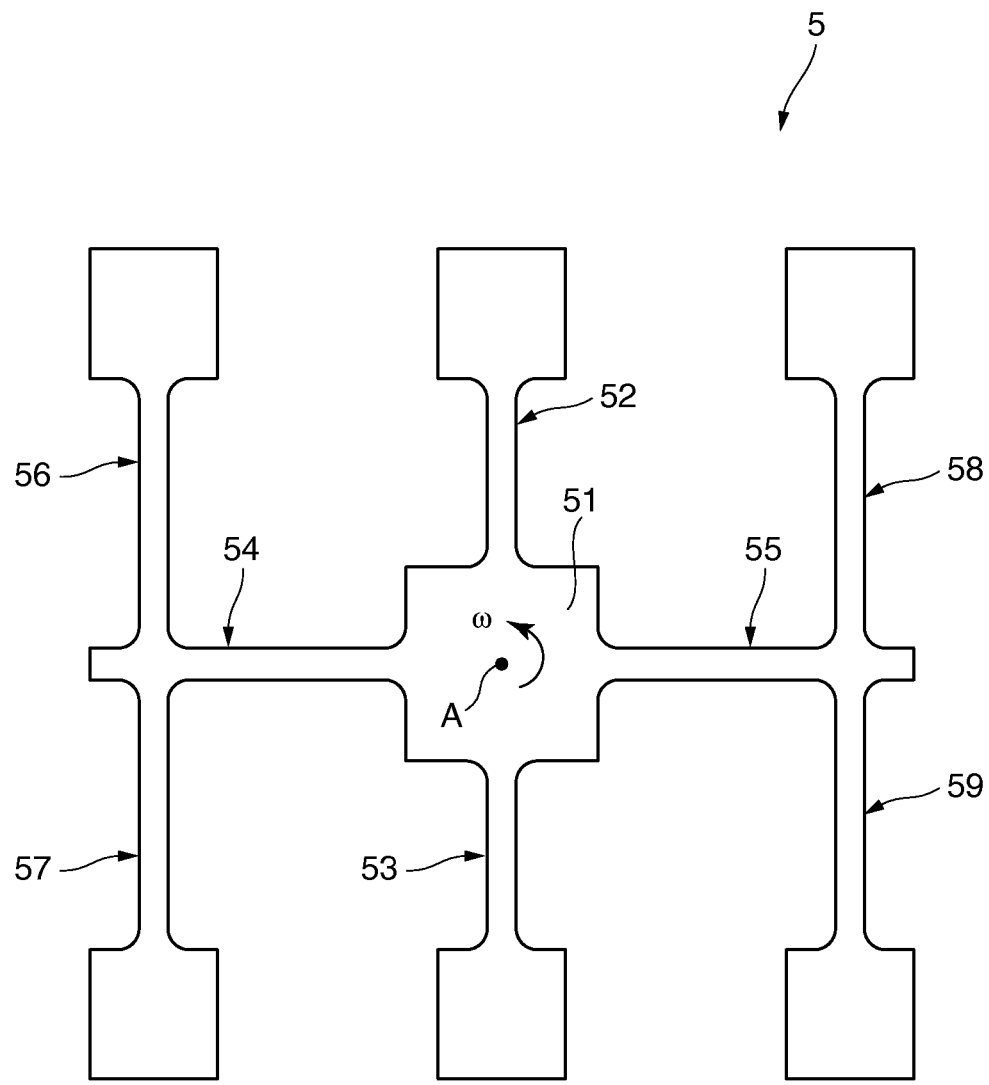
FIG. 4 is a plan view illustrating an example of an angular velocity sensor provided to the module shown in FIGS. 1A and 1B.
Figure 5A:
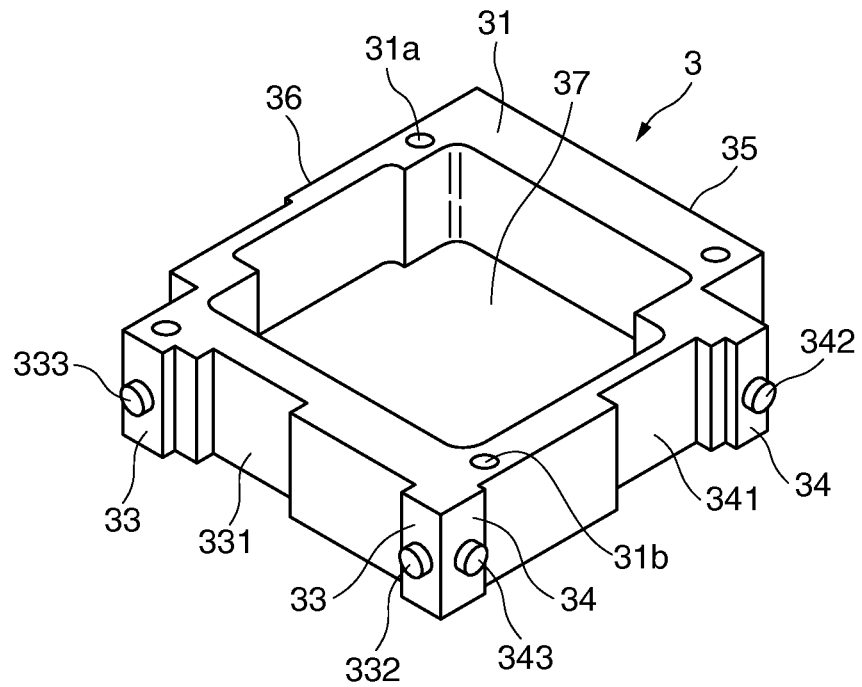
FIGS. 5A and 5B are perspective views illustrating a supporting member provided to the module shown in FIGS. 1A and 1B.
Figure 5B:
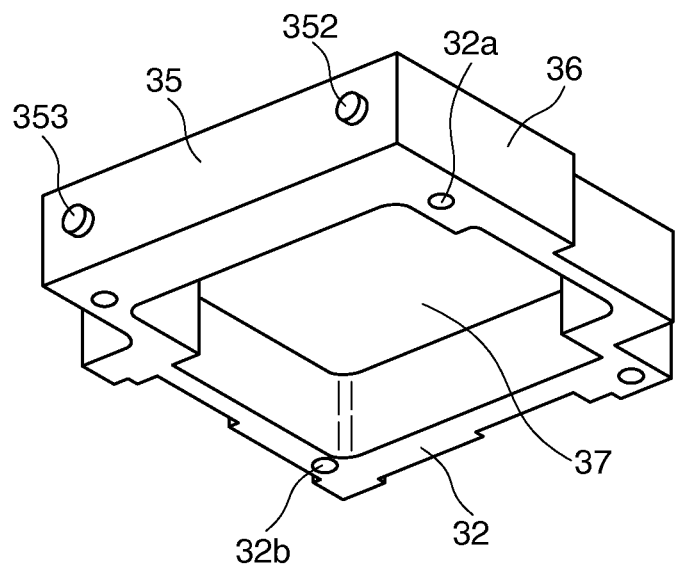
Figure 6:
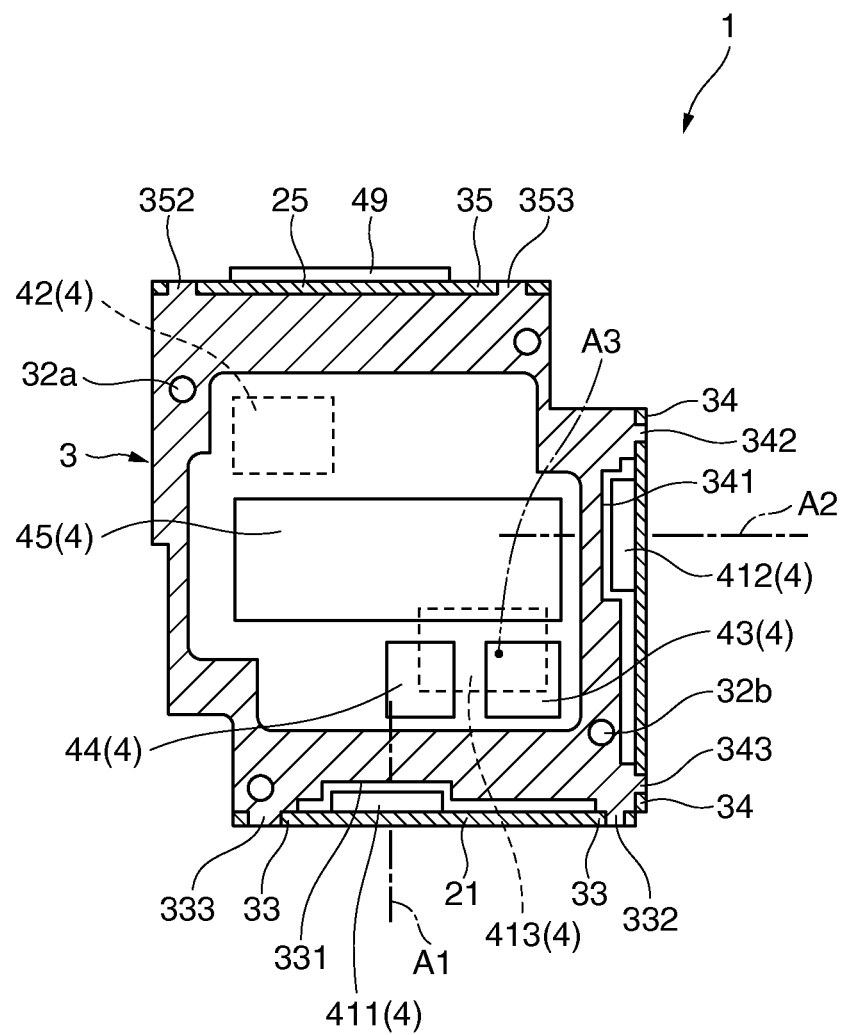
FIG. 6 is a transverse cross-sectional view illustrating the supporting member to which the mounting substrate is fixed.
Figure 7A:
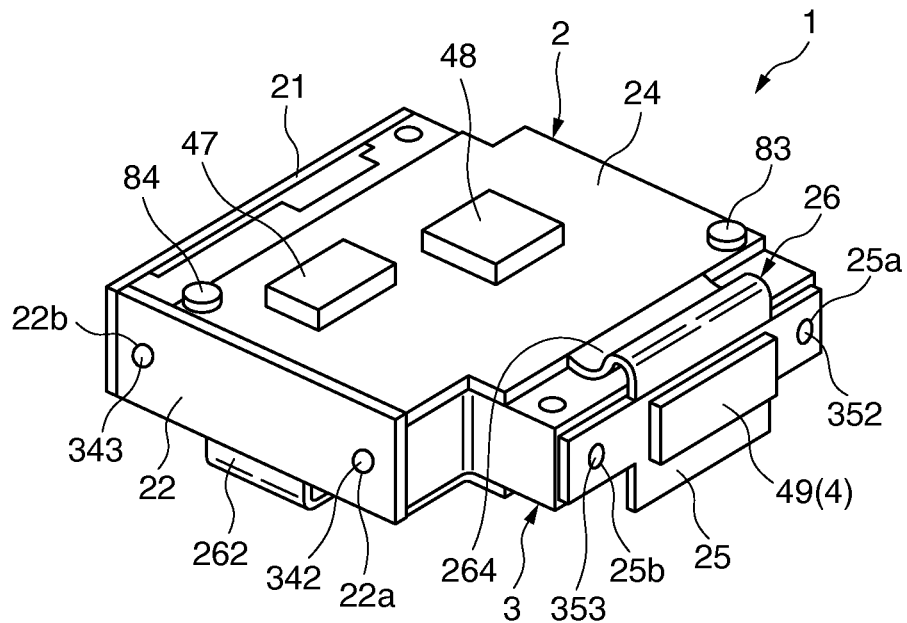
FIGS. 7A and 7B are perspective views illustrating the supporting member to which the mounting substrate is fixed.
Figure 7B:
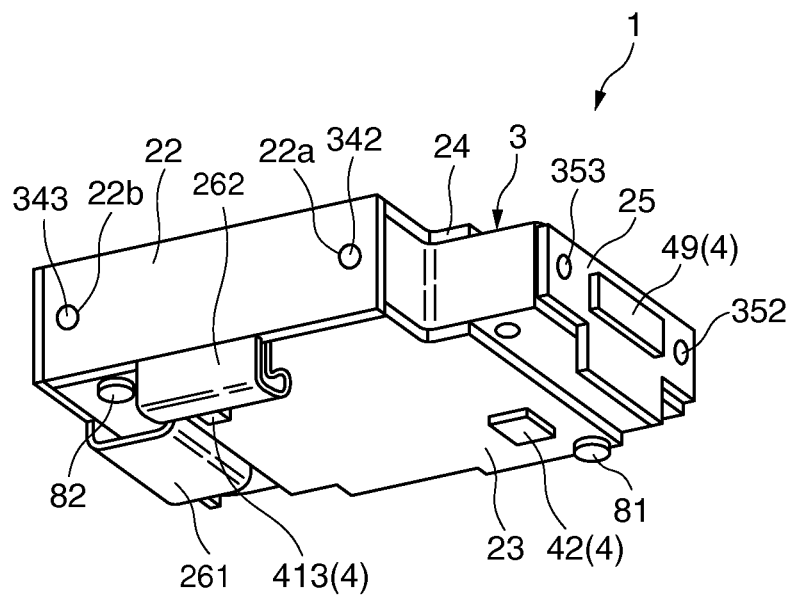
Figure 8:
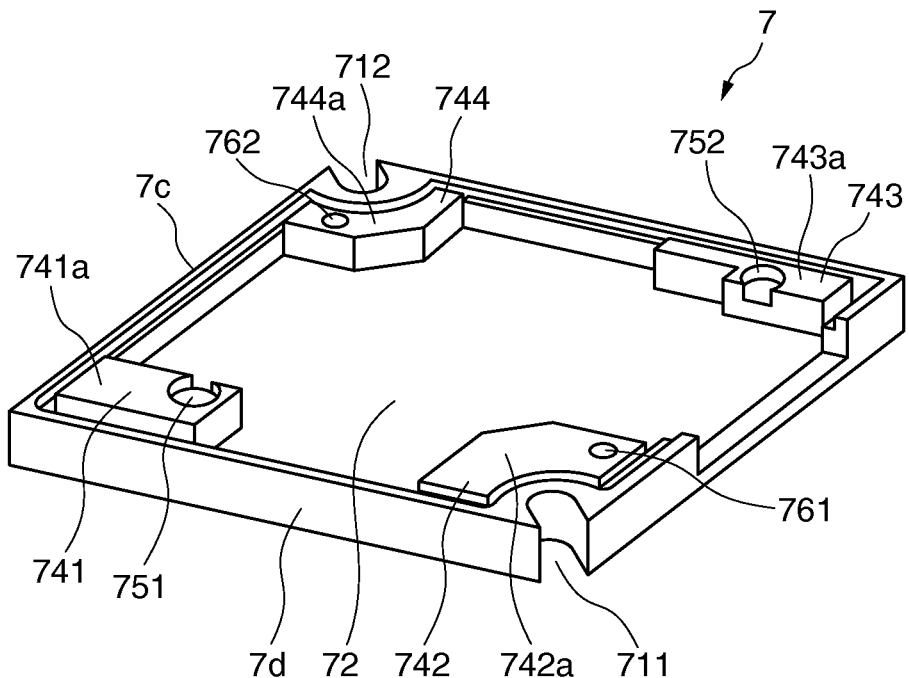
FIG. 8 is a perspective view illustrating the maintaining member provided to the module shown in FIGS. 1A and 1B.
Figure 9:
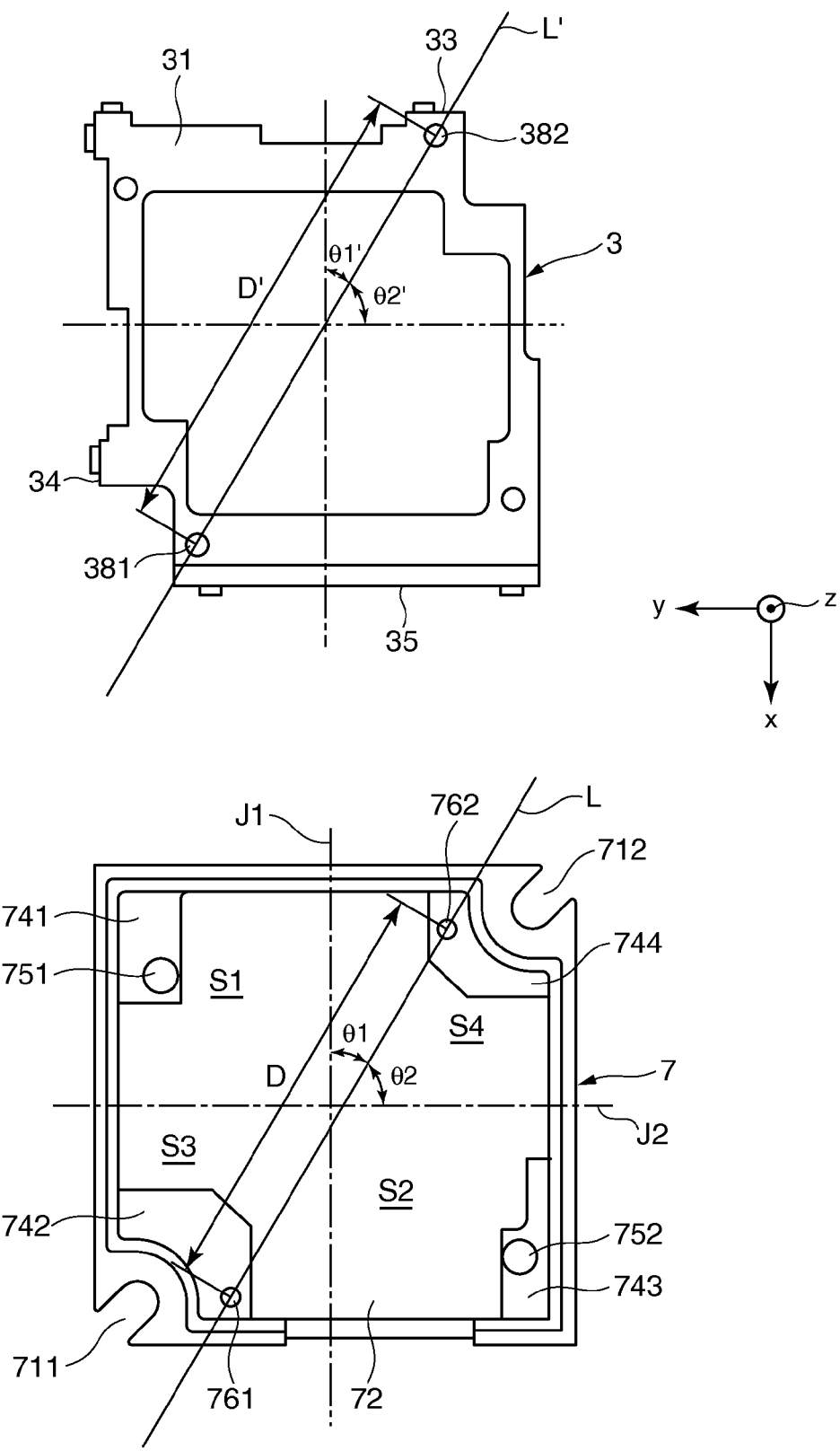
FIG. 9 is a plan view illustrating the supporting member shown in FIGS. 5A and 5B and the maintaining member shown in FIG. 8.

FIGS. 1A and 1B show perspective views illustrating a very suitable embodiment of a module according to the invention, FIGS. 2A and 2B show development views of amounting substrate provided to the module shown in FIGS. 1A and 1B, FIG. 3 shows a perspective view illustrating a state in which the mounting substrate shown in FIGS. 2A and 2B is assembled, FIG. 4 shows a plan view illustrating an example of an angular velocity sensor provided to the module shown in FIGS. 1A and 1B, FIGS. 5A and 5B show perspective views illustrating a supporting member provided to the module shown in FIGS. 1A and 1B, FIG. 6 shows a transverse cross-sectional view illustrating the supporting member to which the mounting substrate is fixed, FIGS. 7A and 7B show perspective views illustrating the supporting member to which the mounting substrate is fixed, FIG. 8 shows a perspective view illustrating the maintaining member provided to the module shown in FIGS. 1A and 1B, and FIG. 9 shows a plan view illustrating the supporting member shown in FIGS. 5A and 5B and the maintaining member shown in FIG. 8. In addition, in FIGS. 1A and 1B, the upper side in the drawings is described as "up", and the lower side in the drawings is described as "down" in the following description for convenience of description. In addition, as shown in FIGS. 1A and 1B, three axes which are orthogonal to each other are referred to as the "x-axis", "y-axis", and "z-axis". The z-axis is an axis parallel to a normal line direction of a maintaining member 7, the x-axis is an axis parallel to the extension direction of a pair of sides of the maintaining member, which are opposite to each other, in plan view of the maintaining member, and the y-axis is an axis parallel to the extension direction of another pair of sides of the maintaining member, which are opposite to each other.

The module 1 shown in FIGS. 1A and 1B includes angular velocity sensors 411 to 413 as each sensor device 4, and is a three-axis gyro W that is capable of detecting the angular velocity around the x-axis, the y-axis, and the z-axis that are orthogonal to each other. This module 1 is excellent in convenience and may be appropriately used for, for example, motion tracing, motion tracking, a motion controller, a pedestrian dead reckoning (PDR), or the like.

As shown in FIGS. 1A and 1B, the module 1 includes a mounting substrate 2 on which the sensor device 4 or other electronic component is mounted, a supporting member 3 that fixes the mounting substrate 2, and a casing 6 that maintains the supporting member 3. In addition, a cover member 10 of the module 1 shown in FIG. 1A is not shown in FIG. 1B.

Hereinafter, these members are sequentially described.

Mounting Substrate

The mounting substrate 2 is a rigid and flexible substrate in which a rigid substrate, which is hard and therefore difficult to deform, and a flexible substrate, which is soft and therefore easy to deform, are combined. As this mounting substrate 2, for example, a known rigid and flexible substrate in which a hard layer such as a glass epoxy substrate is adhered to both sides of a flexible substrate and this hard layer is used as the rigid substrate may be used.

Here, FIG. 2A shows a plan view taken when a developed mounting substrate 2 is seen from one face side thereof, and FIG. 2B shows a plan view taken when the developed mounting substrate 2 is seen from another face side. As shown in FIGS. 2A and 2B, the mounting substrate 2 includes a first rigid substrate 21, a second rigid substrate 22, a third rigid substrate 23, a fourth rigid substrate 24, and a fifth rigid substrate 25 that are disposed to be spaced from each other, and a flexible substrate 26 that connects these substrates.

The flexible substrate 26 includes a connecting portion 261 that connects the first rigid substrate 21 and the third rigid substrate 23, a connecting portion 262 that connects the second rigid substrate 22 and the third rigid substrate 23, a connecting portion 263 that connects the third rigid substrate 23 and the fourth rigid substrate 24, and a connecting portion 264 that connects the fourth rigid substrate 24 and the fifth rigid substrate 25.

In addition, hole portions 21a and 21b are formed at both ends of the first rigid substrate 21, respectively, hole portions 22a and 22b are formed at both ends of the second rigid substrate 22, respectively, hole portions 23a and 23b are formed at both ends (both corner portions that are in a diagonal relationship) of the third rigid substrate 23, respectively, hole portions 24a and 24b are formed at both ends (both corner portions that are in a diagonal relationship) of the fourth rigid substrate 24, respectively, hole portions 25a and 25b are formed at both ends of the fifth rigid substrate 25, respectively. These hole portions 21a to 25b are holes that are used to fix the first to fifth rigid substrates 21 to 25 to the supporting member 3. In addition, the hole portions include both a structure that penetrates from one face to another face, and a structure in which an opening is provided on one face and which does not penetrate to another face.

The respective rigid substrates 21 to 25 and the flexible substrate 26 have a conductor pattern (not shown), and the sensor device 4 or the electronic component is electrically connected in an appropriate manner through this conductor pattern.

In addition, in the following description, for convenience of description, a face of each of the rigid substrates 21 to 25, which is shown in FIG. 2A, is referred to as a "front-side mounting face", and a face shown in FIG. 2B is referred to as a "rear-side mounting face".

The mounting substrate 2 may be deformed into a rectangular parallelepiped shape shown in FIG. 3 by bending (curving) the respective connecting portions 261 to 264 of the flexible substrate 26. Specifically, when the connecting portions 261 to 264 are bent in a manner such that the front-side mounting faces 211 to 251 of the respective rigid substrates 21 to 25 face the inner side, the mounting substrate 2 may be deformed into a rectangular parallelepiped shape in which adjacent rigid substrates are orthogonal to each other. In this state, for example, when the third rigid substrate 23 is set as a bottom face, the fourth rigid substrate 24 makes up a top face, and each of the first, second, and fifth rigid substrates 21, 22, and 25 makes up a side face. As shown in FIGS. 1A and 1B, the mounting substrate 2 is fixed to the supporting member 3 in this deformed state. In other words, the mounting substrate 2 is designed so as to be deformed into a shape corresponding to the supporting member 3.

Hereinbefore, description has been made with respect to the mounting substrate 2. When the mounting substrate 2 is configured by the above-described rigid and flexible substrate, the mounting substrate 2 may be easily deformed, such that the fixing of the mounting substrate 2 to the supporting member 3 may be simple. In addition, the respective rigid substrates 21 to 25 are collectively connected, such that in this regard, the fixing of the mounting substrate 2 to the supporting member 3 may be simply and smoothly performed. In addition, when the sensor devices 4 are mounted on the rigid substrate, unnecessary vibration of the sensor devices 4 may be suppressed and thereby detection accuracy of the module 1 may be improved.

In addition, a ground layer (not shown) is formed in the mounting substrate 2, such that this ground layer exhibits a function of interrupting an external magnetic field. Therefore, in a state shown in FIG. 3, an effect due to the external magnetic field from the outside of the module 1 may be excluded with respect to electronic components (sensor devices 4 mounted on the front-side mounting surfaces 211 to 251 or other electronic components) that are positioned inside the mounting substrate 2.

Sensor Devices

As shown in FIGS. 2A and 2B, the plurality of the sensor devices 4 and other electronic components are mounted on the mounting substrate 2.

As the sensor devices (physical quantity sensors) 4, the three one-axis type angular velocity sensors 411 to 413, and the three-axis type acceleration sensor 42 are mounted on the mounting substrate 2. In addition, as electronic components other than the sensor devices 4, a power supply circuit 43 that drives the sensor devices 4, an amplifying circuit 44 that amplifies an output signal from the sensor devices 4, an analog/digital converting circuit 45 that converts an analog signal amplified by the amplifying circuit 44 to a digital signal, a microcontroller 46 that performs a desired control, a nonvolatile memory 47 such as an EEPROM, an orientation sensor (magnetic sensor) 48 that detects orientation, and a connector (interface connector) 49 that outputs a signal are mounted on the mounting substrate 2. In addition, as the acceleration sensor 42, here, a sensor having a three-axis detecting structure with one device, but similarly to the angular velocity sensor, three acceleration sensors of one axis detection type may be used.

Hereinafter, disposition of these sensor devices 4 and the electronic components will be described in detail.

First Rigid Substrate 21

The angular velocity sensor 411 that detects an angular velocity around the x-axis is mounted on the front-side mounting face 211 of the first rigid substrate 21.

Second Rigid Substrate 22

The angular velocity sensor 412 that detects an angular velocity around the y-axis is mounted on the front-side mounting face 221 of the second rigid substrate 22.

Third Rigid Substrate 23

The power supply circuit 43, the amplifying circuit 44, and the analog/digital converting circuit 45 are mounted on the front-side mounting face 231 of the third rigid substrate 23, and the angular velocity sensor 413 that detects the angular velocity around the z-axis and the acceleration sensor 42 are mounted on the rear-side mounting face 232. In addition, the angular velocity sensor 413, and the acceleration sensor 42 may be mounted on the front-side mounting face 231, and the power supply circuit 43, the amplifying circuit 44, and the analog/digital converting circuit 45 may be mounted on the rear-side mounting face 232.

Here, the analog/digital converting circuit 45 has a size larger than that of other electronic components (the power supply circuit 43 and the amplifying circuit 44) that are mounted on the front-side mounting face 231. Therefore, it is preferable that the analog/digital converting circuit 45 be disposed at a central portion of the front-side mounting face 231. Due to this configuration, the analog/digital converting circuit 45 may be effectively used as a reinforcing member that augments the strength of the third rigid substrate 23. Therefore, unintended vibration caused by bending deformation of the third rigid substrate 23 is suppressed, and therefore unnecessary vibration is not transmitted to the angular velocity sensors 411 to 413, and angular velocity detection accuracy by the angular velocity sensors 411 to 413 (particularly, the angular velocity sensor 413 mounted on the third rigid substrate 23) is raised.

In addition, it is preferable that the angular velocity sensor 413 and the acceleration sensor 42 be disposed at an edge portion of the rear-side mounting face 232 (particularly, in the vicinity of either the hole portion 23a or the hole portion 23b). As described later, the third rigid substrate 23 is fixed to the supporting member 3 by being screw-coupled thereto with the hole portions 23a and 23b interposed therebetween. As a result, the vicinity of the hole portions 23a and 23b (the edge portion of the third rigid substrate 23) is difficult to deform and the unnecessary vibration hardly occurs. Therefore, when the angular velocity sensor 413 and the acceleration sensor 42 are disposed at this place, the angular velocity and the acceleration may be detected with relatively high accuracy.

In addition, when the angular velocity sensor 413 and the acceleration sensor 42 are mounted on the rear-side mounting face 232, the distance from the microcontroller 46 may further increase in a state in which the mounting substrate 2 is fixed to the supporting member 3. In addition, a ground layer of the third rigid substrate 23 may be positioned between the angular velocity sensor 413 and the acceleration sensor 42, and the microcontroller 46. Therefore, it is possible to prevent radiation noise generated from the microcontroller 46 from having an adverse effect on the angular velocity sensor 413 and the acceleration sensor 42, and therefore the detection accuracy of the angular velocity sensor 413 and the acceleration sensor 42 may be improved.

Fourth Rigid Substrate 24

The microcontroller 46 is mounted on the front-side mounting face 241 of the fourth rigid substrate 24, and the nonvolatile memory 47 and the orientation sensor 48 are mounted on the rear-side mounting face 242.

Here, the microcontroller 46 has a size larger than that of other electronic components (the nonvolatile memory 47 and the orientation sensor 48) mounted on the fourth rigid substrate 24. Therefore, it is preferable that the microcontroller 46 be disposed at a central portion of the front-side mounting face 241. Due to this configuration, the microcontroller 46 may be effectively used as a reinforcing member that augments the strength of the fourth rigid substrate 24. Therefore, unnecessary vibration caused by bending deformation of the fourth rigid substrate 24 is suppressed, and unnecessary vibration is not transmitted to the angular velocity sensors 411 to 413, and angular velocity detection accuracy by the angular velocity sensors 411 to 413 is raised.

In addition, radiation noise generated from the microcontroller 46 is interrupted by the ground layer of the fourth rigid substrate 24, such that when the orientation sensor 48 is mounted on a mounting face that is opposite to the microcontroller 46, it is possible to effectively prevent the radiation noise (magnetic field) from reaching the orientation sensor 48 and having an adverse effect on the orientation sensor 48. Therefore, the detection accuracy of the orientation sensor 48 may be improved.

Fifth Rigid Substrate 25

A connector 49 is mounted on a rear-side mounting face 252 of the fifth rigid substrate 25.

Hereinbefore, description has been made in detail with respect to the disposition of the sensor devices 4 and the electronic components.

In the mounting substrate 2, analog circuits including the power supply circuit 43, the amplifying circuit 44, and the analog/digital converting circuit 45 are collectively provided in the third rigid substrate 23, a digital circuit including the microcontroller 46 is collectively provided in the fourth rigid substrate 24. Therefore, the propagation of high-frequency noise generated due to the digital circuit into the analog circuits may be suppressed and therefore excellent reliability and detection accuracy may be exhibited.

The angular velocity sensors 411 to 413 are not particularly limited as long as the angular velocity may be detected, and a known one-axis detection type angular velocity sensor may be used. As these angular velocity sensors 411 to 413, for example, a sensor provided with a vibrating piece 5 shown in FIG. 4 may be used.

The vibrating piece 5 is formed of quartz (piezoelectric material). In addition, the vibrating piece 5 has a base portion 51, a pair of vibrating arms 52 and 53 for detection, which extends in the vertical direction on a plane of paper from both sides of the base portion 51, a pair of connecting arms 54 and 55 that extends in the horizontal direction on the plane of paper from both sides of the base portion 51, and respective pairs of vibrating arms 56, 57, 58, and 59 for driving, which extends in the vertical direction on the plane of paper from both sides of distal ends of the respective connecting arms 54 and 55. In addition, a detection electrode (not shown) is formed on a surface of each of the vibrating arms 52 and 53 for detection, and a driving electrode (not shown) is formed on a surface of each of the vibrating arm 56, 57, 58, and 59 for driving.

In this vibrating piece 5, in a state in which when a voltage is applied to the driving electrode and thereby the vibrating arms 56 and 58 for driving and the vibrating arms 57 and 59 for driving are made to vibrate so as to repeat approaching and separation from each other, when an angular velocity ω around a normal line A of the vibrating piece 5 is applied, a Coriolis force is applied to the vibrating piece 5 and the vibration of the vibrating arms 52 and 53 for detection is excited. In addition, the angular velocity applied to the vibrating piece 5 may be obtained by detecting strain of the vibrating arms 52 and 53 for detection, which is generated due to vibration of the vibrating arms 52 and 53 for detection, using the detection electrode.

Supporting Member

As shown in FIGS. 5A and 5B and FIG. 6, the supporting member 3 has a substantially rectangular parallelepiped shape, and has a top face 31 and a bottom face 32 disposed to be opposite to each other, and four side faces 33, 34, 35, and 36 that connect the top face 31 and the bottom face 32. In this supporting member 3, at least the two adjacent side faces, and the top face 31 or the bottom face 32 are formed with good accuracy so as to be orthogonal to each other. In addition, in this embodiment, all of the faces that are adjacent to each other are formed with good accuracy in a manner such that all of the adjacent faces are orthogonal to each other.

The bottom face 32, and the side faces 33 and 34 are faces to fix the first to third rigid substrates 21 to 23 on which the angular velocity sensors 411 to 413 are mounted as described later. Therefore, when these three faces are formed so as to be orthogonal to each other, the angular velocity sensors 411 to 413 may be accurately disposed in a posture in which respective detection axes A1 to A3 are orthogonal to each other. As a result, according to this module 1, the angular velocity around the respective axes (x-axis, y-axis, and z-axis) may be detected with high accuracy.

Side Face 33

The side face 33 makes up a fixing face that fixes the first rigid substrate 21. The first rigid substrate 21 is fixed to the side face 33 in a state in which the front-side mounting face 211 faces the supporting member 3 side (an inner side). Specifically, the supporting member 3 has two protrusions 332 and 333 that protrude from both ends of the side face 33, and the hole portions 21a and 21b formed in the first rigid substrate 21 engage with the protrusions 332 and 333, and therefore the first rigid substrate 21 is fixed to the side face 33 as shown in FIGS. 7A and 7B.

In this manner, by using two protrusions 332 and 333, the first rigid substrate 21 may be fixed to the side face 33 while performing positioning of the first rigid substrate 21 with respect to the side face 33. Particularly, when the protrusions 332 and 333 are formed on both ends of the side face 33, a spaced distance between the protrusions 332 and 333 is lengthened, and therefore the positioning of the first rigid substrate 21 may be performed with good accuracy.

It is preferable that in the fixing of the first rigid substrate 21 to the side face 33, adhesion using adhesive be used together. Due to this configuration, the first rigid substrate 21 may be strongly fixed to the side face 33. This is true of the second to fifth rigid substrates 22 to 25 described later.

In addition, the supporting member 3 has a recessed portion 331 that is opened in the side face 33. This recessed portion 331 is formed in accordance with a position and an exterior appearance of the angular velocity sensor 411, and in a state in which the first rigid substrate 21 is fixed to the side face 33, the angular velocity sensor 411 is accommodated in the recessed portion 331. That is, the recessed portion 331 makes up a relief portion that prevents the supporting member 3 and the angular velocity sensor 411 from being brought into contact with each other. When this recessed portion 331 is formed, an inner space of the supporting member 3 may be effectively utilized and therefore reduction in size of the module 1 may be promoted.

In addition, a zenith face (face opposite to a face that is mounted on the first rigid substrate 21) of the angular velocity sensor 411 and a surface of the recessed portion 331 of the supporting member may be bonded with adhesive or the like. According to this configuration, the sensor device 4 and the supporting member may be strongly bonded to each other.

Side Face 34

The side face 34 makes up a fixing face that fixes the second rigid substrate 22. The second rigid substrate 22 is fixed to the side face 34 in a state in which the front-side mounting face 221 faces the supporting member 3 side (inner side). Specifically, the supporting member 3 has two protrusions 342 and 343 that protrude from both ends of the side face 34, and the hole portions 22a and 22b formed in the second rigid substrate 22 engage with the protrusions 342 and 343. Therefore, as shown in FIGS. 7A and 7B, the second rigid substrate 22 is fixed to the side face 34.

In addition, the supporting member 3 has a recessed portion 341 that is opened in the side face 34. This recessed portion 341 is formed in accordance with a position and an exterior appearance of the angular velocity sensor 412, and in a state in which the second rigid substrate 22 is fixed to the side face 34, the angular velocity sensor 412 is accommodated in the recessed portion 341. That is, the recessed portion 341 makes up a relief portion that prevents the supporting member 3 and the angular velocity sensor 412 from being brought into contact with each other. When this recessed portion 341 is formed, an inner space of the supporting member 3 may be effectively utilized and therefore reduction in size of the module 1 may be promoted.

Side Face 35

The side face 35 makes up a fixing face that fixes the fifth rigid substrate 25. The fifth rigid substrate 25 is fixed to the side face 35 in a state in which the front-side mounting face 251 faces the supporting member 3 side (an inner side). That is, the fifth rigid substrate 25 is fixed to the side face 35 in a state in which the connector 49 is exposed to the outside of the module 1. Specifically, the supporting member 3 has two protrusions 352 and 353 that protrude from both ends of the side face 35. The hole portions 25a and 25b formed in the fifth rigid substrate 25 engage with the protrusions 352 and 353. Therefore, as shown in FIGS. 7A and 7B, the fifth rigid substrate 25 is fixed to the side face 35.

In addition, in the above description, the protrusions 342, 343, 352, and 353 are provided on the supporting member 3 side, and the hole portions 22a, 22b, 25a, and 25b are provided on the rigid substrate side, but the protrusion may be provided on the rigid substrate side and the hole portions may be provided on the supporting member side.

Bottom Face 32

The bottom face 32 makes up a fixing face that fixes the third rigid substrate 23. The third rigid substrate 23 is fixed to the bottom face 32 in a state in which the front-side mounting face 231 faces the supporting member 3 side (inner side). Specifically, the supporting member 3 is provided with two screw holes 32a and 32b that are formed at two corner portions of the bottom face 32, which are in a diagonal relationship. The screw holes 32a and 32b and the hole portions 23a and 23b formed on the third rigid substrate 23 are made to face each other and are screw-coupled with screws 81 and 82, and thereby the third rigid substrate 23 is fixed to the bottom face 32 as shown in FIGS. 7A and 7B.

In addition, the supporting member 3 is provided with a penetration hole 37 that penetrates through the top face 31 and the bottom face 32, and an exterior appearance has a frame shape. In a state in which the third rigid substrate 23 is fixed to the bottom face 32, the power supply circuit 43, the amplifying circuit 44, and the analog/digital converting circuit 45 that are mounted on the front-side mounting face 231 are accommodated in the penetration hole 37. That is, the penetration hole 37 makes up a relief portion that prevents the supporting member 3, and the power supply circuit 43, the amplifying circuit 44, and the analog/digital converting circuit 45 from being brought into contact with each other. When this penetration hole 37 is formed, the inner space of the supporting member 3 may be effectively utilized and therefore a reduction in size (reduction in thickness) of the module 1 may be promoted.

Top Face 31

The top face 31 makes up a fixing face that fixes the fourth rigid substrate 24. The fourth rigid substrate 24 is fixed to the top face 31 in a state in which the front-side mounting face 241 faces the supporting member 3 side (inner side). Specifically, the supporting member 3 is provided with two screw holes 31a and 31b that are formed at two corner portions of the top face 31, which are in a diagonal relationship. These screw holes 31a and 31b are formed to be opposite to the screw holes 32a and 32b that are formed in the bottom face 32. The screw holes 31a and 31b and the hole portions 24a and 24b formed in the fourth rigid substrate 24 are made to face each other and are screw-coupled with screws 83 and 84, and thereby the fourth rigid substrate 24 is fixed to the top face 31 as shown in FIGS. 7A and 7B.

In addition, as described above, the supporting member 3 is provided with the penetration hole 37. In a state in which the fourth rigid substrate 24 is fixed to the top face 31, the microcontroller 46 mounted on the front-side mounting face 241 is accommodated in the penetration hole 37. That is, the penetration hole 37 also functions as a relief portion that prevents the supporting member 3 and the microcontroller 46 from being brought into contact with each other. When the penetration hole 37 is formed, an inner space of the supporting member 3 may be effectively used, and therefore the reduction in size (reduction in thickness) of the module 1 may be promoted.

In addition, two penetration holes 381 and 382 that penetrate through the top face 31 and the bottom face 32 are formed in the supporting member 3. These two penetration holes 381 and 382 are formed so as to penetrate through two corner portions of the top face 31, which are in a diagonal relationship and in which the screw holes 31a and 31b are not formed, and corner portions of the bottom face 32, which correspond to the two corner portions. As described later, these penetration holes 381 and 382 are screw holes to which a screw is inserted when the supporting member 3 is screw-coupled to the maintaining member 7.

In addition, a constituent material of the supporting member 3 is not particularly limited, but for example, a hard material is preferable so as to prevent deformation from occurring when a pressure is applied from the outside. According to this configuration, a state in which the bottom face 32, the side face 33, and the side face 34 are orthogonal to each other may be reliably maintained and therefore the detection accuracy of the module 1 may be maintained to be high.

This material is not particularly limited, but as this material, various kinds of metal such as iron, nickel, copper, and aluminum, or alloys or intermetallic compounds containing at least one kind from among these kinds of metal, or oxides of these kinds of metal may be exemplified. For example, as the alloys, stainless steel, inconel, and in addition thereto, for example, various aluminum-based alloys such as duralumin may be exemplified.

In this manner, when the supporting member 3 is formed of the metallic material, the following effect may be exhibited. That is, when the supporting member 3 is formed of a material having a high electrical conductivity like a metallic material, for example, radiation noise generated from a microcontroller 46 may be blocked by the supporting member 3. Therefore, it is possible to prevent this radiation noise from reaching the angular velocity sensors 411 and 412 in the recessed portions 331 and 341 and having an adverse effect on the sensors. As a result, the angular velocity may be detected by the angular velocity sensors 411 and 412 with high accuracy.

In addition, as the hard material, in addition to the metallic materials, for example, polyolefin such as polyethylene, polypropylene, and ethylene-propylene copolymer, polyester such as polyvinyl chloride, polystyrene, polyamide, polyimide, polycarbonate, poly-(4-methyl pentene-1), ionomer, an acrylic resin, polymethyl methacrylate, acrylonitrile-butadiene-styrene copolymer (ABS resin), acrylonitrile-styrene copolymer (AS resin), butadiene-styrene copolymer, polyethylene terephthalate (PET), and polybutylene terephthalate (PBT), polyether, polyether ketone (PEK), polyether ether ketone (PEEK), polyether imide, polyacetal (POM), polyphenylene oxide, polysulfone, polyether sulfone, polyphenylene sulfide, polyarylate, aromatic polyester (liquid crystal polymer), polytetrafluoroethylene, polyvinylidene fluoride, and in addition to these, a fluorine-based resin, an epoxy resin, a phenol resin, a urea resin, a melamine resin, a silicone resin, polyurethane, or the like, or copolymers, blends, polymer alloys, and the like, which contain these as a main component, may be exemplified, and one kind or two kinds or more of these may be combined to be used.

In addition, as the constituent material of the supporting member 3, an elastic material that is capable of exhibiting a vibration-proof and vibration isolating function that absorbs unnecessary vibration is preferable. As this material, for example, various rubber materials (particularly, vulcanized rubber) such as a natural rubber, isoprene rubber, butadiene rubber, styrene-butadiene rubber, nitrile rubber, chloroprene rubber, butyl rubber, acrylic rubber, ethylene-propylene rubber, silicone rubber, and fluoro-rubber, various kinds of thermoplastic elastomer such as styrene series, polyolefin series, polyvinyl chloride series, polyurethane series, polyester series, polyamide series, polybutadiene series, trans-polyisoprene series, fluoro-rubber series, and chlorinated polyethylene series may be exemplified, and one kind or two kinds or more of these may be combined to be used.

In addition, as the constituent material of the supporting member 3, vibration-isolating steel is preferably used so as to make an anti-deformation property and the vibration-proofing and vibration-isolating functions be compatible with each other.

Since this supporting member 3 is provided with three faces that are orthogonal to each other, that is, the bottom face 32, the side face 33, and the side face 34, the three angular velocity sensors 411 to 413 may be disposed to be orthogonal to each other in a simple and reliable manner only by fixing the third rigid substrate 23 on which the angular velocity sensor 413 is mounted to the bottom face 32, by fixing the first rigid substrate 21 on which the angular velocity sensor 411 is mounted to the side face 33, and by fixing the second rigid substrate 22 on which the angular velocity sensor 412 is mounted to the side face 34. That is, the three angular velocity sensors 411 to 413 may be disposed in a manner such that a detection axis A1 of the angular velocity sensor 411, a detection axis A2 of the angular velocity sensor 412, and a detection axis A3 of the angular velocity sensor 413 are orthogonal to each other. Therefore, the angular velocity detection accuracy of the module 1 may be improved in a simple manner.

In addition, the angular velocity sensors 411 and 412 are positioned on the supporting member 3 side in relation to the mounting substrate 2. Therefore, the angular velocity sensor 411 is prevented from being exposed to the outside of the module 1 by the first rigid substrate 21, and the angular velocity sensor 412 is prevented from being exposed to the outside of the module 1 by the second rigid substrate 22. According to this arrangement, for example, at the time of manufacturing the module 1, or at the time of assembling the module 1 to another electronic apparatus, the angular velocity sensors 411 and 412 do not come into contact with a worker, a manufacturing apparatus, or the like, and therefore these sensors may be effectively prevented from being broken. In addition, as described above, an external magnetic field may be interrupted by the ground layer provided to the mounting substrate 2, such that the angular velocity may be detected by the sensors with good accuracy while the angular velocity sensors 411 and 412 are not affected by the magnetic field.

Casing

As shown in FIGS. 1A and 1B, the casing 6 includes the maintaining member 7 to which the supporting member 3 is fixed, and the cover member (cap) 10 that covers the supporting member 3 fixed to the maintaining member 7. Hereinafter, the maintaining member 7 and the cover member 10 will be sequentially described.

Maintaining Member 7

As shown in FIG. 8, the maintaining member 7 is a plate-shaped member, and has a substantially rectangular shape in plan view. In this manner, when the maintaining member 7 is made to have the substantially rectangular shape in plan view, it is easy to confirm the respective axes of x-axis, y-axis, and z-axis (the detection axes A1 to A3 of the angular velocity sensors 411 to 413) from the outside of the module 1, and when the module 1 is mounted on a circuit board (object) (not shown) or the like, the mounting (positioning) of the module 1 may be easy.

In addition, the bottom face of the maintaining member 7 is parallel to the xy plane (plane made by the x-axis and y-axis). Therefore, when the module 1 is mounted on the circuit board (object) such as a mother board, a mounting face of the circuit board becomes parallel to the xy plane. As a result, for example, in an electronic apparatus 500 described later or the like, arrangement of the circuit board may be easily performed, and therefore the angular velocity around the respective axes may be detected by the module 1 in a relatively exact manner.

In addition, elongated holes 711 and 712 that are opened to the outer periphery (outer edge) are formed at two corner portions of the maintaining member 7, which are positioned in a diagonal relationship, respectively. These elongated holes 711 and 712 extend in the same direction as each other. These elongated holes 711 and 712 are screw holes to fix the module 1 to the circuit board. That is, the elongated holes 711 and 712 makeup a fixing portion that fixes the module 1 to the circuit board. When the module 1 is screw-coupled to the circuit board using the elongated holes 711 and 712, the module 1 may be fixed to the circuit board in a simple and reliable manner. In addition, the elongated holes include both a structure that penetrates from one face to another face, and a structure in which an opening is provided on one face and which does not penetrate to another face.

Here, when one of the elongated holes 711 and 712 is in a state of being temporarily fixed to the circuit board with a screw, the module 1 may be made to rotate around the z-axis on the circuit board with the screw made as the center of the rotational movement. Therefore, first, the module 1 is temporarily fixed (screw-coupled) using one elongated hole, and then the positioning of the module 1 around the z-axis is performed, and then the other elongated hole is screw-coupled, and finally both screws are tightened, and thereby the module 1 may be fixed to the circuit board in a state in which the module 1 is positioned around the z-axis with good accuracy.

In addition, in a state in which the module 1 is temporarily coupled to the circuit board using the elongated holes 711 and 712, the module 1 may be made to slide with respect to the circuit board in an extension direction of the elongated holes 711 and 712. Therefore, the position of the module 1 in the x-axis direction and the y-axis direction may be minutely adjusted with respect to the circuit board. As a result, the positioning of the module 1 with respect to the circuit board may be performed with good accuracy.

In addition, the maintaining member 7 is provided with a concave portion 72, which is opened, at a central portion of the top face excluding an edge portion. The concave portion 72 functions as an accommodation portion that accommodates the angular velocity sensor 413 and the acceleration sensor 42 that are mounted on the rear-side mounting face 232 of the third rigid substrate 23, in a state in which the supporting member 3 is fixed to the maintaining member 7. In other words, the concave portion 72 makes up a relief portion that prevents the maintaining member 7, and the angular velocity sensor 413 and the acceleration sensor 42 from being brought into contact with each other. When this concave portion 72 is formed, the space of the maintaining member 7 may be effectively utilized and therefore the reduction in size (reduction in thickness) of the module 1 may be promoted.

In addition, the maintaining member 7 is provided with four alignment portions 741, 742, 743, and 744. These alignment portions 741 to 744 have a function of performing the positioning of the supporting member 3 with respect to the maintaining member 7 around the respective axes of x-axis, y-axis, and z-axis. Specifically, the alignment portions 741 to 744 have a function of positioning the supporting member 3 with respect to the maintaining member 7 in a manner such that a plane made by the detection axis A1 of the angular velocity sensor 411 and the detection axis A2 of the angular velocity sensor 412 becomes parallel to the xy plane, and the detection axis A3 of the angular velocity sensor 413 becomes parallel to the z-axis.

These four alignment portions 741 to 744 are provided at four corner portions of the concave portion 72, respectively, and protrude from the bottom face of the concave portion 72. In other words, when in xy plan view, a first axis J1 and a second axis J2, which pass through the center of the maintaining member 7 and which are orthogonal to each other, are set, and four areas partitioned by the two axes are set as a first area S1, a second area S2, a third area S3, and a fourth area S4, the four alignment portions 741 to 744 are provided in such a manner that one alignment portion is positioned at each area. Therefore, the alignment portions 741 and 742 may be spaced greatly apart from each other, and therefore the supporting member 3 may be mounted on the alignment portions 741 to 744 in a relatively stable manner. In addition, the number of the alignment portions is not limited to four, and for example, a pair of alignment portions may be provided at the first and third areas that are opposite to each other with the center interposed therebetween.

In addition, alignment portions 741, 742, 743, and 744 have mounting faces 741a, 742a, 743a, and 744a that are made up by planes parallel to the xy plane, respectively, and these four mounting faces 741a to 744a are positioned to be flush with the xy plane. Therefore, when the supporting member 3 is mounted on these mounting faces 741a to 744a in order for the bottom face 32 to be opposite to the mounting faces, the detection axis A3 of the angular velocity sensor 413 becomes parallel to the z-axis. In this manner, the positioning of the angular velocity sensor 413 around the x-axis and y-axis with respect to the maintaining member 7 may be simply performed with good accuracy by only mounting the supporting member 3 on the four alignment portions 741 to 744.

In addition, the mounting faces 741a, 742a, 743a, and 744a are lower than opening face (that is, top face) of the concave portion 72 and are positioned within the concave portion 72. Therefore, a step portion is formed between the top face of the maintaining member 7 and the mounting faces 741a, 742a, 743a, and 744a, and the step portion functions as a guiding portion at the time of mounting the supporting member 3. In addition, large deviation of the supporting member 3 mounted once on the mounting faces 741a, 742a, 743a, and 744a, or separation of the supporting member 3 from the mounting faces 741a, 742a, 743a, and 744a may be suppressed.

In addition, in this embodiment, the alignment portions 741 to 744 make up a part of side walls of the concave portion 72. Therefore, a configuration of the maintaining member 7 becomes simple.

In these alignment portions 741 to 744, two alignment portions 742 and 744 that are in a diagonal relationship have screw holes 761 and 762, respectively. The screw holes 761 and 762 are screw holes that fix the supporting member 3 mounted on the maintaining member 7 (the mounting faces 741a to 744a) to the maintaining member 7. That is, the screw holes 761 and 762 make up a fixing portion that fixes the supporting member 3 to the maintaining member 7.

The screw hole 761 is formed to be opened to the mounting face 742a, and the screw hole 762 is formed to be opened to the mounting face 744a. In addition, as shown in FIG. 9, in xy plane view, a distance D between centers of the screw holes 761 and 762 is substantially the same as a distance D' between centers of the penetration holes 381 and 382 of the supporting member 3. In addition, an angle θ1 made by a straight line L connecting centers of the screw holes 761 and 762 and the x-axis is substantially the same as an angle θ1' made by a straight line L' connecting centers (center axes) of the penetration hole 381 and 382 and a face parallel to the side face 34, and an angle θ2 made by the straight line L and the y-axis is substantially the same as an angle θ2' made by the straight line L' and a face parallel to the side face 33.

Therefore, when the supporting member 3 is mounted on the maintaining member 7 (the mounting faces 741a to 744a) in a manner such that the screw hole 761 is opposite to (communicates with) the penetration hole 381, and the screw hole 762 is opposite to (communicates with) the penetration hole 382, the detection axis A1 of the angular velocity sensor 411 fixed to the side face 33 of the supporting member 3 and the x-axis become substantially parallel to each other, and the detection axis A2 of the angular velocity sensor 412 fixed to the side face 34 and the y-axis become substantially parallel to each other. In addition, when screws 85 and 86 are fastened into the screw holes 761 and 762 through the penetration holes 381 and 382, the supporting member 3 is completely fixed to the maintaining member 7 while maintaining a state in which the detection axes A1, A2, and A3 of the angular velocity sensors 411, 412, and 413 are parallel to the x-axis, y-axis, and z-axis, respectively (refer to FIG. 1B).

In this manner, according to the maintaining member 7, the positioning of the supporting member 3 around the z-axis with respect to the maintaining member 7 may be simply performed with good accuracy by only performing positional alignment between the penetration holes 381 and 382, and the screw holes 761 and 762, and performing the fixing. In other words, when the detection axes A1, A2, and A3 of the angular velocity sensors 411, 412, and 413 are not parallel to the x-axis, y-axis, and z-axis, respectively, the supporting member 3 may not be fixed to the maintaining member 7, such that the positioning of the supporting member 3 with respect to the maintaining member 7 may be performed in a relatively reliable manner. In this manner, the screw holes 761 and 762 are used as fixing portions that fix the supporting member 3 to the maintaining member 7, and are used as alignment portions that perform the positioning of the supporting member 3 around the z-axis, and therefore the positioning of the supporting member 3 with respect to the maintaining member 7 may be performed in a relatively accurate manner.

In addition, in regard to the fixing of the supporting member 3 to the maintaining member 7, bonding using adhesive may be used together with the screw-coupling. Therefore, since an adhesive layer is interposed between the maintaining member 7 and the supporting member 3, unnecessary vibration of the supporting member 3 is suppressed. As a result thereof, the detection accuracy of the angular velocity sensors 411 to 413 or the like may be improved. In addition, in this embodiment, the screw holes 761 and 762 are provided as a fixing portion, but protruding portions that engage with the penetration holes 381 and 382 instead of the screw holes may be provided. According to this configuration, the same effect as described above may be exhibited.

In addition, in the alignment portions 741 to 744, the two alignment portions 741 and 743, which are in a diagonal relationship, are provided with concave portions 751 and 752, respectively. The concave portion 751 is formed to be opened to the mounting face 741a, and the concave portion 752 is formed to be opened to the mounting face 743a. These concave portions 751 and 752 make up a relief portion (accommodation portion) that prevents the maintaining member 7 and head portions (heads) of the screws 82 and 81 from brought into contact with each other at the time of fixing the supporting member 3 to the maintaining member 7. Therefore, the concave portions 751 and 752 have a shape and size capable of accommodating the head portions of the screws 82 and 81. When these concave portions 751 and 752 are provided, breakage of the supporting member 3 and the maintaining member 7, deformation of the supporting member 3, or the like may be prevented and therefore the reliability of the module 1 is improved.

In addition, the concave portions 751 and 752 also function as a temporary alignment portion that performs the positioning of the supporting member 3 around the z-axis with respect to the maintaining member 7. That is, when the supporting member 3 is mounted on the maintaining member 7 in a manner such that the head portions of the screws 82 and 81 are accommodated in the concave portions 751 and 752, the positioning of the supporting member 3 around the z-axis with respect to the maintaining member 7 may be substantially performed. In addition, in this state, excessive rotational movement (displacement) of the supporting member 3 around the z-axis is restricted, such that the positional alignment of between the screw holes 761 and 762 and the penetration holes 381 and 382 may be simply performed.

It is preferable that the concave portion 751 have a shape capable of regulating movement of the head portion of the screw 82 within the concave portion 751 in the xy plane direction so as to effectively exhibit the function of the temporary alignment portion. This is true of the concave portion 752. According to this configuration, in a state in which the head portions of the screw 82 and 81 are accommodated in the concave portions 751 and 752, respectively, the shaking (rotational movement around the z-axis) of the supporting member 3 is further suppressed, and the above-described temporary positioning of the supporting member 3 may be further effectively performed.

Although not being particularly limited, a material having a vibration damping characteristic is preferable as a constituent material of the maintaining member 7. According to this configuration, unnecessary vibration of the supporting member 3 is suppressed and therefore the detection accuracy of the angular velocity sensors 411 to 413 or the like may be improved. As this material, for example, various vibration damping alloys such as a magnesium alloy, an iron-based alloy, a copper alloy, a manganese alloy, and a Ni—Ti based alloy may be exemplified.

Hereinbefore, description has been made in detail with respect to the configuration of the maintaining member 7.

According to this maintaining member 7, the supporting member 3 may be simply fixed, and the positioning of the supporting member 3 around the respective axes of x-axis, y-axis, and z-axis with respect to the maintaining member 7 may be simply performed with high accuracy. Therefore, the module 1 that is capable of exhibiting excellent detection accuracy may be obtained.

In addition, as described above, in the case of mounting the module 1 on a circuit board, when the positioning of the module 1 around the z-axis with respect to the circuit board with two side faces 7c and 7d of the maintaining member 7, which are orthogonal to each other, made as a reference, is performed the detection axes A1 and A2 of the angular velocity sensors 411 and 412 may be made to face a desired direction in a simple manner. Specifically, the side face 7c is a face parallel to the detection axis A1, and the side face 7d is a face parallel to the detection axis A2. Therefore, when the positioning is performed with the side faces 7c and 7d made as a reference, the detection axes A1 and A2 of the angular velocity sensors 411 and 412 may be made to face a desired direction in a simple manner. In addition, the side faces 7c and 7d intersect each other while the elongated holes 711 and 712 are not formed between the side faces 7c and 7d, such that when the positioning is performed with the vicinity of a connection portion between the side faces 7c and 7d made as a reference, the above-described positioning may be performed in a relatively simple and accurate manner.

Cover Member

The cover member 10 is fixed to the maintaining member 7 so as to cover the supporting member 3. According to this configuration, the sensor devices 4 or other electronic components may be protected. In addition, the cover member 10 has an opening 101 formed in a side face thereof, and in a state in which the cover member 10 is fixed to the maintaining member 7, the connector 49 is exposed from the opening 101 to the outside. According to this configuration, electrical connection between an external apparatus and the connector 49 may be easily performed. The method of fixing the maintaining member 7 and the cover member 10 is not particularly limited, and pitting, screwing, and bonding with adhesive may be used.

In addition, two corner portions of the cover member 10 are cut out so as not to overlap the elongated holes 711 and 712 formed in the maintaining member 7 in xy plan view. Therefore, the fixing of the module 1 to the circuit board (object) may be easily performed.

Although not particularly limited, as a constituent material of the cover member 10, for example, polyolefin such as polyethylene, polypropylene, and ethylene-propylene copolymer, polyester such as polyvinyl chloride, polystyrene, polyamide, polyimide, polycarbonate, poly-(4-methyl pentene-1), ionomer, an acrylic resin, polymethyl methacrylate, acrylonitrile-butadiene-styrene copolymer (ABS resin), acrylonitrile-styrene copolymer (AS resin), butadiene-styrene copolymer, polyethylene terephthalate (PET), and polybutylene terephthalate (PBT), polyether, polyether ketone (PEK), polyether ether ketone (PEEK), polyether imide, polyacetal (POM), polyphenylene oxide, polysulfone, polyether sulfone, polyphenylene sulfide, polyarylate, aromatic polyester (liquid crystal polymer), polytetrafluoroethylene, polyvinylidene fluoride, and in addition to these, a fluorine-based resin, an epoxy resin, a phenol resin, a urea resin, a melamine resin, a silicone resin, polyurethane, or the like, or copolymers, blends, polymer alloys, and the like, which contain these as a main component, may be exemplified, and one kind or two or more kinds of these may be combined to be used.

Hereinbefore, description has been made with respect to the casing 6.

In the module 1, a filler (molding material) 9 is filled in the concave portion 72 of the maintaining member 7, and a gap between the concave portion 72 and the third rigid substrate 23 is buried with the filler 9. The rear-side mounting face 232 (the angular velocity sensor 413 and the acceleration sensor 42) of the third rigid substrate 23 or the connecting portions 261, 262, and 263 that extend from the third rigid substrate 23 are fixed with the filler 9, and therefore unnecessary vibration is effectively prevented from occurring in the third rigid substrate 23. As a result, the detection accuracy of the angular velocity sensors 411 to 413 or the acceleration sensor 42 may be improved.

A material having an insulating property is preferable as a constituent material of the filler 9. Although not particularly limited, as this material, for example, polyolefin such as polyethylene, polypropylene, and ethylene-propylene copolymer, polyester such as polyvinyl chloride, polystyrene, polyamide, polyimide, polycarbonate, poly-(4-methyl pentene-1), ionomer, an acrylic resin, polymethyl methacrylate, acrylonitrile-butadiene-styrene copolymer (ABS resin), acrylonitrile-styrene copolymer (AS resin), butadiene-styrene copolymer, polyethylene terephthalate (PET), and polybutylene terephthalate (PBT), polyether, polyether ketone (PEK), polyether ether ketone (PEEK), polyether imide, polyacetal (POM), polyphenylene oxide, polysulfone, polyether sulfone, polyphenylene sulfide, polyarylate, aromatic polyester (liquid crystal polymer), polytetrafluoroethylene, polyvinylidene fluoride, and in addition to these, a fluorine-based resin, an epoxy resin, a phenol resin, a urea resin, a melamine resin, a silicone resin, polyurethane, or the like, or copolymers, blends, polymer alloys, and the like, which contain these as a main component, may be exemplified, and one kind or two kinds or more of these may be combined to be used.

2. Electronic Apparatus

Figure 10:
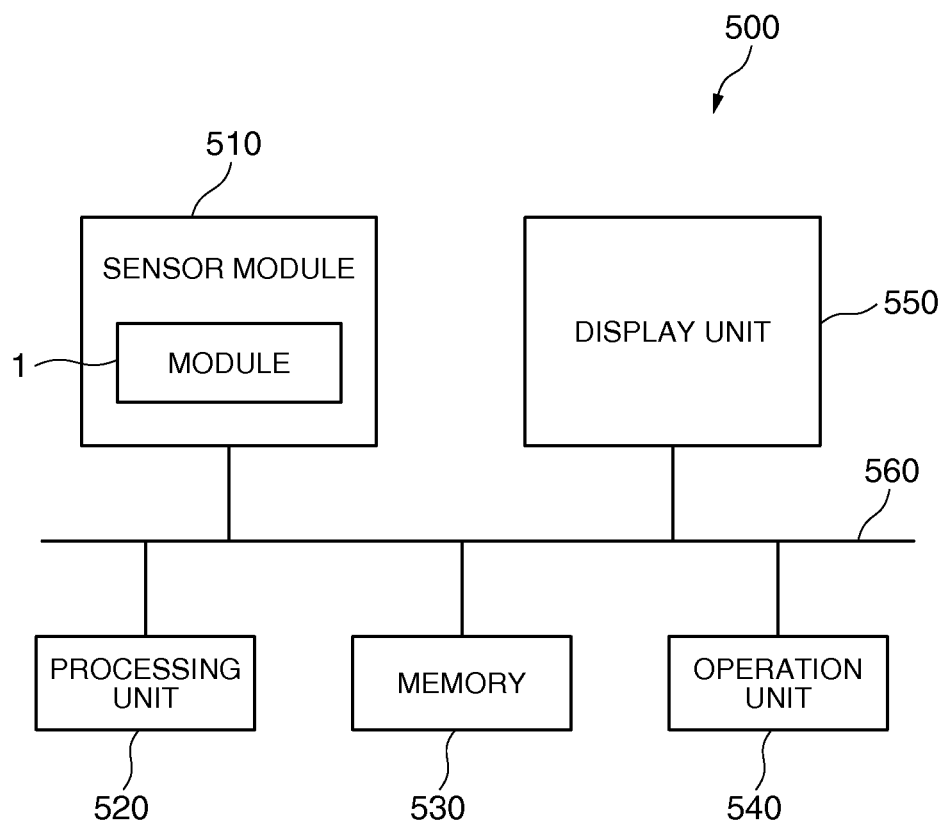
FIG. 10 is a view illustrating an example of a configuration of an electronic apparatus in which a module is mounted.

The above-described module 1 may be assembled into various electronic apparatus. Hereinafter, an electronic apparatus according to the invention in which the module 1 is mounted will be described. FIG. 10 shows a view illustrating an example of a configuration of an electronic apparatus 500 in which the module 1 is mounted. The electronic apparatus 500 is not particularly limited, and for example, a digital still camera, a video camera, a car navigation system, a cellular phone, a mobile PC, a robot, a gaming machine, a game controller, or the like may be exemplified.

The electronic apparatus 500 shown in FIG. 10 includes a sensor module 510 including the module 1, a processing unit 520, a memory 530, an operation unit 540, and a display portion 550. These are connected to each other by a bus 560. The processing unit (CPU, MPU, or the like) 520 performs a control of the sensor module 510 or the like, or an entire control of the electronic apparatus 500. In addition, the processing unit 520 performs processing on the basis of angular velocity information detected by the sensor module 510. For example, the processing unit 520 performs processing for camera shake correction, a posture control, GPS autonomous navigation, or the like on the basis of the angular velocity information. The memory 530 stores a control program or various pieces of data, and functions as a work area or a data storage area. The operation unit 540 allows a user to operate the electronic apparatus 500. The display unit 550 displays various kinds of information to the user.

Above, a description has been made with respect to the module and electronic apparatus according to the invention on the basis of embodiments shown in the drawings, but the invention is not limited thereto, and configurations of respective portions may be substituted with arbitrary configurations having substantially the same functions.

In addition, in the above described embodiments, description has been made with respect to a configuration in which the rigid and flexible substrate is used as the mounting substrate, but the configuration of the mounting substrate is not limited to this, and for example, the mounting substrate may be configured by a plurality of separate rigid substrates (5 sheets of rigid substrate). In this case, for example, the respective rigid substrates may be fixed to the supporting member and then these rigid substrates may be electrically connected to each other using a connector or the like.

In addition, in the above-described embodiments, description has been made with respect to an example in which the vertical lines of the fixing faces of the supporting member are orthogonal to each other, but it is not necessarily limited to this example. For example, the supporting member may be formed of a triangular pyramid shape and the mounting substrates may be disposed along side faces of the triangular pyramid.

The entire disclosure of Japanese Patent Application No. 2011-122791, filed May 31, 2011 is expressly incorporated by reference herein.

What is claimed is:

1. A maintaining member that maintains a module, the maintaining member comprising:
    at least a pair of alignment portions that determine a maintaining position of the module,
    wherein at least one of the alignment portions is provided with a concave portion, and the other of the at least one alignment portions is provided with a fixing portion, and the at least one of the alignment portions make up at least a part of the side walls of the concave portion;
    wherein each alignment portions has a mounting face to fix the module,
    wherein the respective mounting faces of the alignment portions are flush with each other,
    wherein a protruding portion is provided to one side of the mounting face of the alignment portions or the module, and a hole portion is provided to the other side thereof, and the protruding portion and the hole portion engage with each other,
    when the maintaining member is partitioned into a first region to a fourth region by a first axis and a second axis that are orthogonal to each other in plan view with respect to a center of the maintaining member, the first region and the second region are present at positions that are point-symmetrical to each other with respect to the center, and
    the alignment portions having the concave portions are disposed at the first region and the second region, respectively, and the alignment portions having the fixing portions are disposed at the third and fourth region respectively,
    wherein the maintaining member further includes a plurality of side faces, and at least one of the alignment portions is positioned at an intersection of two of the plurality of side faces.

2. The maintaining member according to claim 1, wherein the mounting face of the alignment portions is lower than an opening face of the concave portion.

3. The maintaining member according to claim 1, wherein the third region and the fourth region are present at positions that are point-symmetrical to each other with respect to the center.

4. The maintaining member according to claim 1,
    wherein the maintaining member is provided with a filler on a face side in which the alignment portions are provided.

5. The maintaining member according to claim 1, wherein the fixing portion of the maintaining member is provided to fix the maintaining member to an object.

6. A sensor module, comprising:
    a module; and
    a maintaining member that maintains the module,
    wherein the maintaining member includes at least a pair of alignment portions that determine a maintaining position of the module,
    wherein at least one of the alignment portions is provided with a concave portion, and the other of the at least one alignment portion is provided with a fixing portion, and the alignment portions make up at least a part of the side walls of the concave portion;
    each of the alignment portions has a mounting face to fix the module,
    wherein the respective mounting faces of the alignment portions are flush with each other,
    wherein a protruding portion is provided to one side of the mounting face of the alignment portions or the module, and a hole portion is provided to the other side thereof, and the protruding portion and the hole portion engage with each other,
    when the maintaining member is partitioned into a first region to a fourth region by a first axis and a second axis that are orthogonal to each other in plan view with respect to a center of the maintaining member, the first region and the second region are present at positions that are point-symmetrical to each other with respect to the center,
    the alignment portions having the concave portions are disposed at the first region and the second region, respectively, and the alignment portions having the fixing portions are disposed at the third and fourth region respectively, and
    the module is maintained on the mounting faces,
    wherein the maintaining member further includes a plurality of side faces, and at least one of the alignment portions is positioned at an intersection of two of the plurality of side faces.

7. The sensor module according to claim 6, wherein the module is provided with an electronic component on the maintaining member side, and at least a part of the electronic component is accommodated in the concave portion.

8. The sensor module according to claim 6, wherein the third region and the fourth region are present at positions that are point-symmetrical to each other with respect to the center.

9. The sensor module according to claim 6, wherein the maintaining member is provided with a filler on a face side in which the alignment portion is provided, and the maintaining member and the module are bonded with the filler.

10. The sensor module according to claim 6, wherein a plurality of physical quantity sensors in which detection axes intersect each other is mounted in the module.

11. The sensor module according to claim 6, wherein the fixing portion of the at least one alignment is portion provided to fix the maintaining member to an object.

12. The sensor module according to claim 6, further comprising: a cover member that covers the module and is fixed to the maintaining member.

13. An electronic apparatus, comprising: the sensor module according to claim 6.

\* \* \* \* \*